United States Patent [19]

Noso et al.

[11] Patent Number: 4,531,228
[45] Date of Patent: Jul. 23, 1985

[54] SPEECH RECOGNITION SYSTEM FOR AN AUTOMOTIVE VEHICLE

[75] Inventors: Kazunori Noso, Yokosuka; Norimasa Kishi, Yokohama; Toru Futami, Yokosuka, all of Japan

[73] Assignee: Nissan Motor Company, Limited, Kanagawa, Japan

[21] Appl. No.: 428,233

[22] Filed: Sep. 29, 1982

[30] Foreign Application Priority Data

Oct. 20, 1981 [JP] Japan .................................. 56-166460
May 1, 1982 [JP] Japan .................................. 57-72591

[51] Int. Cl.³ .............................................. G10L 1/00
[52] U.S. Cl. ...................................................... 381/46
[58] Field of Search ................................... 381/41–50, 381/110; 364/513.5

[56] References Cited

U.S. PATENT DOCUMENTS 4,052,568 10/1977 Jankowski .
4,057,690 11/1977 Vagliani et al. .
4,357,491 11/1982 Daabouz et al. ...................... 381/46

OTHER PUBLICATIONS

IBM Technical Discl. Bulletin–vol. 11, No. 4, Sep. 1968, "Signal Presence Detector w/Speech Tone Discrimination".
Bell System Technical Journal, Feb. 1976, "An Algorithm for Determining the Endpoints of . . . ".
IEEE Transactions on Acoustics, Speech & Signal Processing, vol. ASSP-29, No. 4, Aug. 1981, "An Improved Endpoint Detector for . . . ".

Primary Examiner—E. S. Matt Kemeny
Attorney, Agent, or Firm—Lowe, King, Price & Becker

[57] ABSTRACT

A speech recognition system includes speech presence detection which uses a first level threshold of ambient noise/silence above which speech start is decided for a signal. Speech end is decided when the signal falls to a second threshold equal to the first, unless a predetermined time interval of speech is exceeded after start, causing a corrected second threshold to be calculated and used.

14 Claims, 21 Drawing Figures

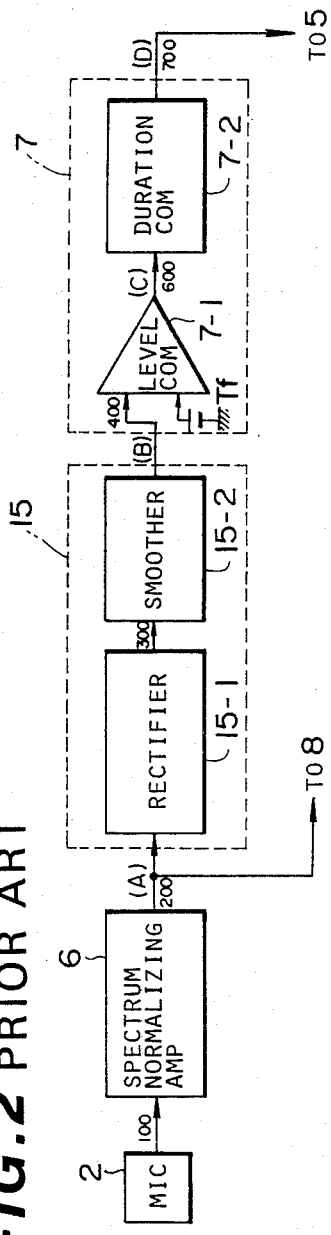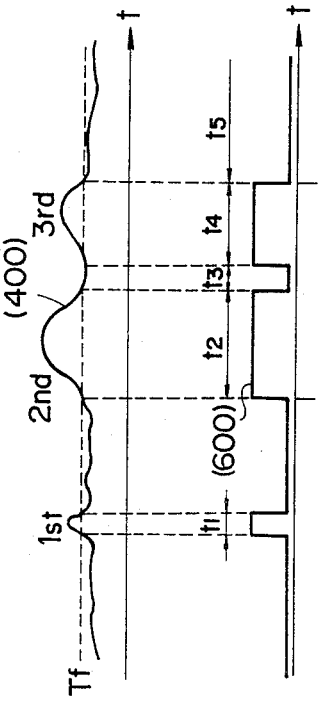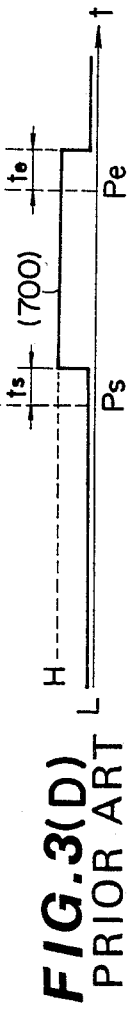
FIG.2 PRIOR ART
FIG.3(A) PRIOR ART
FIG.3(B) PRIOR ART
FIG.3(C) PRIOR ART
FIG.3(D) PRIOR ART

SPEECH RECOGNITION SYSTEM FOR AN AUTOMOTIVE VEHICLE

BACKGROUND OF THE INVENTION

1. Field of the Invention

The present invention relates generally to a speech recognition system for an automotive vehicle, and more particularly to a speech recognition system by which a driver's spoken instructions can be reliably recognized even as engine noise fluctuates within the passenger compartment.

2. Description of the Prior Art

There is a well-known speech recognizer which can activate various actuators in response to human spoken instructions. When this speech recognizer is mounted on a vehicle, the headlight, for instance, can be turned on or off in response to spoken instructions such as "Headlight on" or "Headlight off". Such a speech recognizer usually can recognize various spoken instructions in order to control various actuators; however, there are some problems involved in applying this system to an automotive vehicle.

Usually, the speech recognizer is used in a relatively quiet environment; however, the speech recognition system for an automotive vehicle is usually used within a relatively noisy passenger compartment and additionally the noise fluctuates intensely therewithin. Therefore, one of the major problems is how to cope with erroneous spoken phrase recognitions caused by fluctuating engine noise within the passenger compartment.

In order to distinguish a spoken instruction from noise, conventionally there is provided a voice detector in the speech recognizer, by which the start and the end of a spoken instruction are determined by detecting whether the magnitude of a spoken instruction signal exceeds a predetermined reference threshold voltage level for a predetermined period of time or whether the magnitude of the spoken instruction signal drops below the predetermined reference threshold voltage level for another predetermined period of time, respectively.

In the prior-art speech recognizer, however, since the reference threshold voltage level is fixed, when noise signal level is high, for instance, when the vehicle is running within a tunnel and therefore the noise level exceeds the reference threshold voltage level for a long time, there exists a problem in that the voice detector can erroneously consider this state to represent the beginning of a spoken instruction. In other words, the prior-art speech recognizer is prone to erroneous recognition due to intense noise within the passenger compartment.

A more detailed description of a typical prior-art speech recognizer and a typical prior-art voice detector will be made with reference to the attached drawings in conjunction with the present invention under DETAILED DESCRIPTION OF THE PREFERRED EMBODIMENTS.

SUMMARY OF THE INVENTION

With these problems in mind therefore, it is the primary object of the present invention to provide a speech recognition system for an automotive vehicle which can reliably detect the start and end of a spoken instruction even though the noise level is high and fluctuates violently within the passenger compartment of an automotive vehicle, that is, which can reliably prevent erroneous recognition of spoken instructions due to noise within the passenger compartment.

To achieve the above-mentioned object, in the speech recognition system including voice detecting means for an automotive vehicle according to the present invention, the start of spoken instruction is detected on the basis of a threshold level varying according to the magnitude of an inputted spoken instruction signal level including noise within the passenger compartment. However, the end of the spoken instruction is detected on the basis of the threshold level fixed when the start of spoken instruction is detected or another threshold level corrected to a still higher level through calculations when the end of spoken instruction is not detected for more than a predetermined time period after the start of the spoken instruction has been detected.

The speech recognition system for an automotive vehicle according to the present invention comprises a second smoother for smoothing a spoken instruction signal, a multiplier for multiplying the smoothed spoken instruction signal, and a holding circuit for passing the multiplied spoken instruction signal as a reference start-detection threshold level in detecting the start of spoken instruction but for holding the multiplied spoken instruction signal obtained in detecting the spoken instruction start as a reference end-detection threshold level after the start has been detected, in addition to the conventional voice detecting means provided for the speech recognizer.

Further, another embodiment of the speech recognition system for an automotive vehicle according to the present invention comprises a threshold calculator for calculating a reference start-detection threshold level in dependence upon the detected spoken instruction signal data, a threshold corrector for correcting the calculated start-detection threshold level to a higher reference end-detection threshold level, a timer unit, a memory unit, and a start and end comparators for comparing the detected spoken instruction signal levels with the reference start- or end-detection threshold levels under consideration of time interval, in addition to the conventional speech recognizer.

Furthermore, the speech recognition system according to the present invention can be embodied by a microcomputer executing the same or similar processes, calculations and/or operations.

BRIEF DESCRIPTION OF THE DRAWINGS

The features and advantages of the speech recognition system for an automotive vehicle according to the present invention will be more clearly appreciated from the following description taken in conjunction with the accompanying drawings in which like reference numerals designate corresponding elements or sections throughout the drawings and in which:

FIG. 2 is a schematic block diagram of a detailed portion of the voice detecting means of the prior-art speech recognizer shown in FIG. 1;

FIG. 3(A) is a graphical representation of the waveforms of a spoken instruction signal including noise as measured at point (A) in FIG. 2;

FIG. 3(B) is a graphical representation of the waveforms of the spoken instruction signal including noise and a reference threshold voltage level as measured at point (B) in FIG. 2;

FIG. 3(C) is a graphical representation of the waveform of the spoken instruction pulse signal as measured at point (C) in FIG. 2;

FIG. 3(D) is a graphical representation of the waveform of the spoken instruction start/end signal as measured at point (D) in FIG. 2;

DETAILED DESCRIPTION OF THE PREFERRED EMBODIMENTS

To facilitate understanding of the present invention, a brief reference will be made to the principle or operation of a typical prior-art speech recognizer, with reference to FIG. 1.

Figure 1:
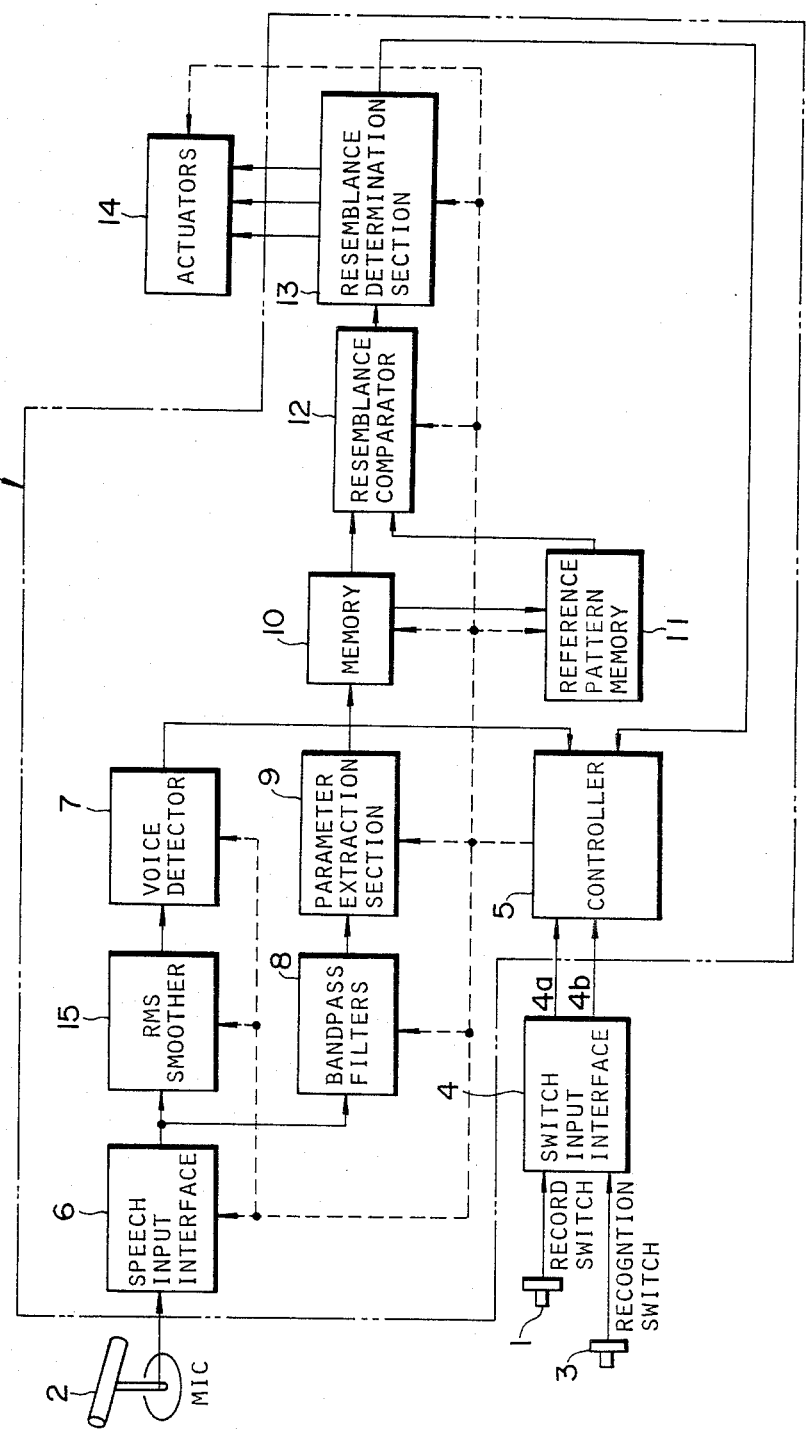
FIG. 1 is a schematic block diagram of a typical prior-art speech recognizer for assistance in explaining the operations thereof.

FIG. 1 shows a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 1 and outputs a signal to a controller 5 via a wire 4a. In response to this signal, the controller 5 outputs a recording mode command signal to other sections in order to preset the entire speech recognizer to the recording mode. In the spoken instruction recording mode, when the user says a phrase to be used as a spoken instruction, such as "open doors", near a microphone 2, the spoken phrase is transduced into a corresponding electric signal through the microphone 2, amplified through a speech input interface 6 consisting mainly of a spectrum-normalizing amplifier, smoothed through a root-mean-square (RMS) smoother 15 including a rectifier and a smoother, and finally inputted to a voice detector 7.

The spectrum-normalizing amplifier amplifies the input at different gain levels at different frequencies, so as to adjust the naturally frequency-dependent power spectrum of human speech to a more nearly flat power spectrum. This voice detector 7 detects whether or not the magnitude of the spoken phrase signal exceeds a predetermined level for a predetermined period of time (150 to 250 ms) in order to recognize the start of the spoken phrase input signal and whether or not the magnitude of the signal drops below a predetermined level for a predetermined period of time (about 300 ms) in order to recognize the end of the signal. Upon detection of the start of the signal, this voice detector 7 outputs another recording mode command signal to the controller 5. In response to this command signal, the controller 5 activates a group of bandpass filters 8, so that the spoken phrase signal from the microphone 2 is divided into a number of predetermined frequency bands. Given to a parameter extraction section 9, the frequency-divided spoken phrase signals are squared or rectified therein in order to derive the voice power spectrum across the frequency bands and then converted into corresponding digital time-series matrix-phonetic pattern data (explained later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as refernce data for use in recognizing the speech instructions.

After having recorded the reference spoken instructions, the user can input speech instructions, such as "open doors", to the speech recognizer through the microphone 2 while depressing a recognition switch 3. When this recognition switch 3 is depressed, the switch input interface 4 detects the depression of the recognition switch 3 and outputs a signal to the controller 5 via a wire 4b. In response to this signal, the controller 5 outputs a recognition mode command signal to other sections in order to preset the entire speech recognizer to the recognition mode. In this spoken phrase recognition mode, when the user says an instruction phrase similar to the one recorded previously near the microphone 2 and when the voice detector 7 outputs a signal, the spoken instruction is transduced into a corresponding electric signal through the microphone 2, amplified through the speech input interface 6, filtered and divided into voice power spectra across the frequency bands through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the level of correlation of the inputted speech instruction to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. The correlation factor calculated by the resemblance comparator 12 is next given to a resemblance determination section 13 to determine whether or not the calculated values lie within a predetermined range, that is, to evaluate their cross-correlation. If within the range, a command signal, indicating that a recognition-mode spoken instruction has adequate resemblance to one of the recorded instruction phrases, is outputted to one of actuators 14 in order to open the vehicle doors, for instance. The above-mentioned operations are all executed in accordance with command signals outputted from the controller 5.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 can all be incorporated within the microcomputer, executing the same or similar processes, calculations and/or operations as explained hereinabove.

The digital time-series matrix-phonetic pattern data and the Tchebycheff distance are defined as follows:

In the case where the number of the bandpass filters is four and the number of time-series increments for each is 32, the digital recording-mode time series matrix-phonetic pattern data can be expressed as $$F(A) = f(i,j) = \begin{vmatrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{vmatrix}$$

where A designates a first recording-mode speech instruction (reference) (e.g. OPEN DOORS), i denotes the filter index, and j denotes time-series increment index.

If a first recognition-mode speech instruction (e.g. OPEN DOORS) is denoted by the character "B", the Tchebycheff distance can be obtained from the following expression:

$$l = |F(A) - F(B)| = \sum_{i=1}^{4} \sum_{j=1}^{32} |f_A(i,j) - f_B(i,j)|$$

FIG. 2 shows in more detail the speech detection section of the voice detecting means of the prior-art speech recognizer shown in FIG. 1, which is closely relevant to the present invention.

In the figure, a spoken phrase inputted via a microphone and transduced into a corresponding electric signal (100) first passes through the speech input interface 6. The interface 6 is mainly made up of a spectrum-normalizing amplifier by which the electric signal is amplified to a greater degree at higher frequencies. This is because speech sounds tend to be attenuated greatly in the higher frequency range. The waveform of the spoken instruction signal (200) including noise outputted from the spectrum-normalizing amplifier 6 may appear as shown in FIG. 3(A).

The amplified spoken instruction signal (200) is next applied to the bandpass filters 8 to begin the process of recognizing whether the signal is a correctly spoken instruction and to the RMS smoother 15, consisting mainly of a rectifier 15-1 and a smoother 15-2, to begin the process of detecting the start and end of the spoken phrase. The rectified and smoothed spoken instruction signal (400) may appear as shown in FIG. 3(B), in which $T_f$ denotes a constant reference threshold voltage level.

The smoothed signal (400) is then conducted to the voice detector 7 including a voltage level comparator 7-1 and a pulse duration comparator 7-2. The voltage level comparator 7-1 compares the voltage level of the smoothed signal with the predetermined reference threshold voltage level $T_f$ and outputs a H-voltage level pulse signal (600) only while the voltage level of the speech instruction signal exceeds the reference threshold level $T_f$ as depicted in FIG. 3(C).

The pulse duration comparator 7-2 compares the pulse width of the H-voltage level pulse signal (600) with a predetermined reference spoken instruction start time $t_s$ and the pulse width of the L-voltage level pulse signal (600) with another predetermined reference end time $t_e$ and outputs a H-voltage level signal (700) only when the H-voltage level pulse width exceeds the reference start time $t_s$ and a L-voltage level signal (700) only when the L-voltage level pulse width exceeds the reference end time $t_e$.

To explain in more detail with reference to FIGS. 3(C) and (D), if the pulse width of the first H-voltage level pulse signal is labeled $t_1$, since $t_1$ is shorter than the reference start time $t_s$, the pulse duration comparator 7-2 outputs no H-voltage level signal. On the other hand, if the pulse width of the second H-voltage level pulse signal is labeled $t_2$, since $t_2$ is longer than the reference start time $t_s$, the pulse duration comparator 7-2 outputs a H-voltage level signal, indicating the start of a spoken instruction. In this case, the H-voltage level start signal (700) from the pulse duration comparator 7-2 is delayed by the reference start time $t_s$ after the actual start time $P_s$ of the spoken instruction. Thereafter, this H-voltage level start signal is outputted until the duration comparator 7-2 detects the end of speech instruction.

Next, when the H-voltage level pulse signal $t_2$ changes to a L-voltage level for a period of time $t_3$, since the $t_3$ is shorter than the reference end time $t_e$, the pulse duration comparator 7-2 outputs no L-voltage level signal, that is, duration comparator 7-2 sustains the H-voltage level signal.

Thereafter in this case, even if a third pulse signal having a pulse width $t_4$ is outputted again from the voltage level comparator 7-1, since the pulse duration comparator 7-2 is still outputting a H-voltage level signal, the operation of the duration comparator 7-2 is not effected.

Next, when the H-voltage level pulse signal $t_4$ changes to a L-voltage level for a period of time $t_5$, since $t_5$ is longer than the reference end time $t_e$, the pulse duration comparator 7-2 outpus a L-voltage level signal, indicating the end of speech instruction. In this case, the L-voltage level end signal from the duration comparator 7-2 is delayed by the reference end time $t_e$ after the actual end time $P_e$ of speech instruction. Thereafter, the end signal is outputted until the duration comparator 7-2 detects the start of another speech instruction.

In response to the H-voltage level signal from the duration comparator 7-2 as shown in FIG. 3(D), the controller 5 outputs a command signal to activate a group of bandpass filters 8 and other sections to recognize the spoken instruction signal outputted from the spectrum-normalizing amplifier 6, as already explained.

In the prior-art voice detecting means connected to the microphone as described above, since the reference threshold level in the voltage level comparator 7-1 is fixed at a predetermined level, the speech recognizer cannot cope well with the fluctuations of noise level within the passenger compartment, with the result that accurate detection of speech instruction start and end is comprised so that noise may be interpreted as attempts at speech and/or spoken instructions may be ignored.

In view of the above description and with reference to the attached drawings, the embodiments of the voice detecting means of the speech recognition system for an automotive vehicle according to the present invention will be described hereinbelow.

In brief summation of this first embodiment, although the start of spoken instruction is detected on the basis of a threshold level varying according to the magnitude of the spoken instruction, the end of the spoken instruction is detected on the basis of the threshold level fixed when the start of spoken instruction is detected. Therefore, even when noise level increases intensely after the start has been detected, it is possible to detect the end of spoken instruction reliably.

Figure 4:
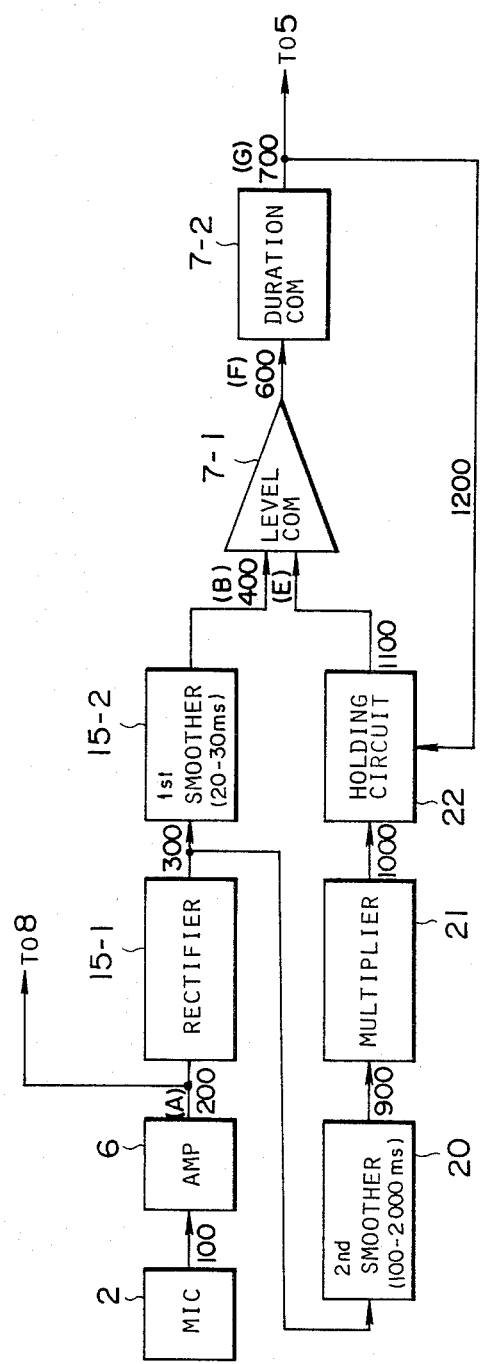
FIG. 4 is a schematic block diagram of an essential portion of a first embodiment of a voice detecting means of the speech recognition system for an automotive vehicle according to the present invention.

FIG. 4 shows a first embodiment of a voice detecting means of the speech recognition system according to the present invention.

In the figure, the voice detecting means comprises a microphone 2, a spectrum normalizing amplifier 6, a rectifier 15-1, a first smoother 15-2 having a time constant of 20 to 30 ms, a voltage level comparator 7-1 and a pulse duration comparator 7-2 in the same way as in the prior-art voice detecting means of FIG. 2. In addition to these sections, this first embodiment of the voice detecting means comprises a second smoother 20 having a time constant of 100 to 2000 ms which is much longer than that of the first smoother 15-2, a multiplier 21 for multiplying the voltage level of the smoothed signal (900) to an appropriate voltage level and outputting a multiplied signal (1000) corresponding thereto, and a holding circuit 22 for freely passing the multiplied signal (1000) from the multiplier 21 or for holding the same signal (1000) in response to a holding signal (1200) (explained later) outputted from the pulse duration comparator 7-2 and outputting the held signal (1100).

Figure 5:
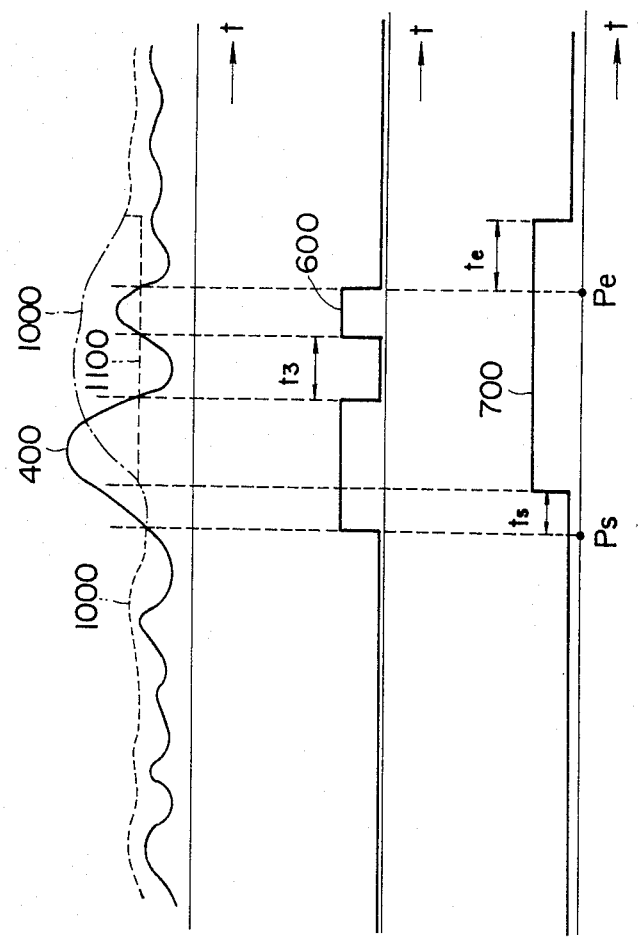
FIG. 5(A) is a graphical representation of the waveforms of a spoken instruction signal including noise as measured at points (B) and (E) in FIG. 4.
FIG. 5(B) is a graphical representation of the waveform of the spoken instruction pulse signal as measured at point (F) in FIG. 4.
FIG. 5(C) is a graphical representation of the waveform of the spoken instruction start/end signal as measured at point (G) in FIG. 4.

Now, follows the description of operation of this first embodiment with reference to FIGS. 5(A) to 5(C).

When a spoken instruction is inputted to the microphone 2, the signal corresponding thereto is transduced into a signal (100) and amplified into another signal (200) through the spectrum-normalizing amplifier 6. The amplified signal (200) is then given to the bandpass filters 8 and the rectifier 15-1. The signal (300) rectified by the rectifier 15-1 is applied to the first smoother 15-2 and the second smoother 20 simultaneously. The rectified signal (300) applied to the first smoother 15-2 is smoothed at a relatively short time constant into a smoothed signal (400) and then inputted to one input terminal of the voltage level comparator 7-1. On the other hand, the rectified signal (300) applied to the second smoother 20 is smoothed at a relatively long time constant into another smoothed signal (900), multiplied by the multiplier (21) into a multiplied signal (1000), and then applied to the other input terminal of the voltage level comparator 7-1, as it is, via the holding circuit 22 as a start-detection threshold level signal (1100).

The start of the smoothed spoken instruction signal (400) can be detected as follows: when the voltage level of a rectified spoken instruction signal (300) increases, since the time constant of the first smoother 15-2 is relatively short, the signal (400) outputted from the first smoother 15-2 rises immediately as depicted in FIG. 5(A). On the other hand, since the time constant of the second smoother 20 is fairly long, the signal (900) outputted from the second smoother 20 cannot rise abruptly from the beginning. Therefore, the signal (1000) multiplied by the multiplier 21 or the signal (1100) passed through the holding circuit 22 (both the signals are the same in this state, because a holding signal (1200) is not yet inputted to the holding circuit 22 and therefore the signal (1000) is passed therethrough as it is) is at a relatively low level as depicted in FIG. 5(A) at the early stage. Accordingly, when the smoothed signal (400) is inputted to the level comparator 7-1, since the voltage level of the signal (400) exceeds the threshold level (1000), the comparator 7-1 outputs a H-voltage level pulse signal (600) as depicted in FIG. 5(B) and the duration comparator 7-2 outputs another H-voltage level pulse signal (700) when the H-voltage level pulse width of the signal (600) exceeds the reference start time ts, as depicted in FIG. 5(C), thus it being possible to detect the start of a spoken instruction reliably.

In contrast with this, the end of the spoken instruction signal (400) can be detected as follows: When the pulse duration comparator 7-2 outputs the H-voltage level signal (700), since this signal is also applied to the holding circuit 22 as a holding signal (1200), the holding circuit 22 holds the signal (1000) outputted from the multiplier 21, being delayed by the reference start time ts after the actual start time Ps, for generating another reference threshold level (1100) for detecting the end of the spoken instruction as depicted FIG. 5(A). As shown in FIGS. 5(A) and 5(B), when the spoken instruction smoothed signal (400) intermits for a time period $t_3$ and therefore the level of the signal (400) drops below the reference end threshold level (1100), if the time $t_3$ is shorter than the reference end time te, the pulse duration comparator 7-2 sustains the H-voltage level signal (700) for recognizing the spoken instruction. Thereafter, when the spoken instruction is completed and therefore the smoothed signal (400) drops below the held reference end threshold level (1100) for more than the reference end time te, the end of the spoken instruction is detected being delayed by the reference end time te after the actual end time Pe, as depicted in FIG. 5(C), by the pulse duration comparator 7-2. Further, the instant the H-voltage level signal (700) changes to a L-voltage level, since the holding signal (1200) is now not applied to the holding circuit 22, the held reference threshold level (1100) returns to the level of the multiplied signal (1000) as shown in FIG. 5(A).

The reason why such a holding circuit 22 as described above is additionally provided is as follows: unless there is provided the holding circuit 22, since the reference end threshold level (1000) increases as shown by the dotted and dashed line in FIG. 5(A), the smoothed signal (400) drops below the threshold level (1000) before the end of spoken instruction, thus resulting in an erroneous spoken instruction end detection. In other words, since the time constant of the second smoother 20 is longer than that of the first smoother 15-2, the reference threshold level (1000) increases gradually with a time delay as the smoothed spoken instruction signal (400) increases gradually; that is, the timing of two signals (400, 1000) does not match.

Figure 6:
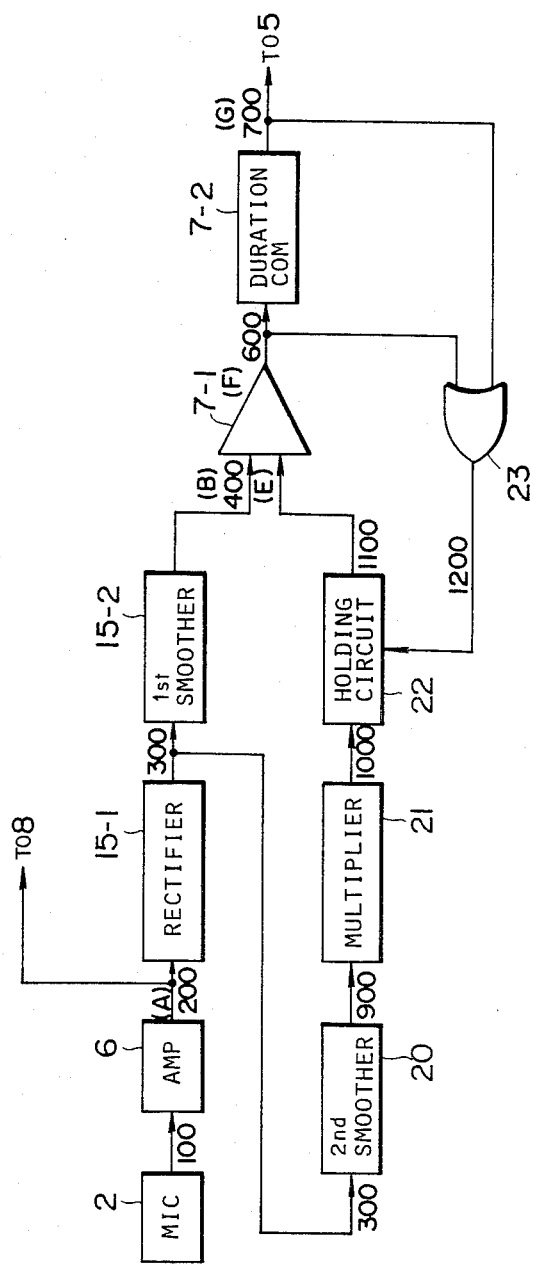
FIG. 6 is a schematic block diagram of a second embodiment of a voice detecting means of the speech recognition system for an automotive vehicle according to the present invention.

FIG. 6 shows a second embodiment of a voice detecting means of the speech recognition system according to the present invention.

In the figure, an OR gate 23 is additionally provided in the first embodiment shown in FIG. 4. The OR gate 23 can output an ORed holding signal (1200) of two H-voltage level pulse signals from the voltage level comparator 7-1 and the pulse duration comparator 7-2.

Figure 7:
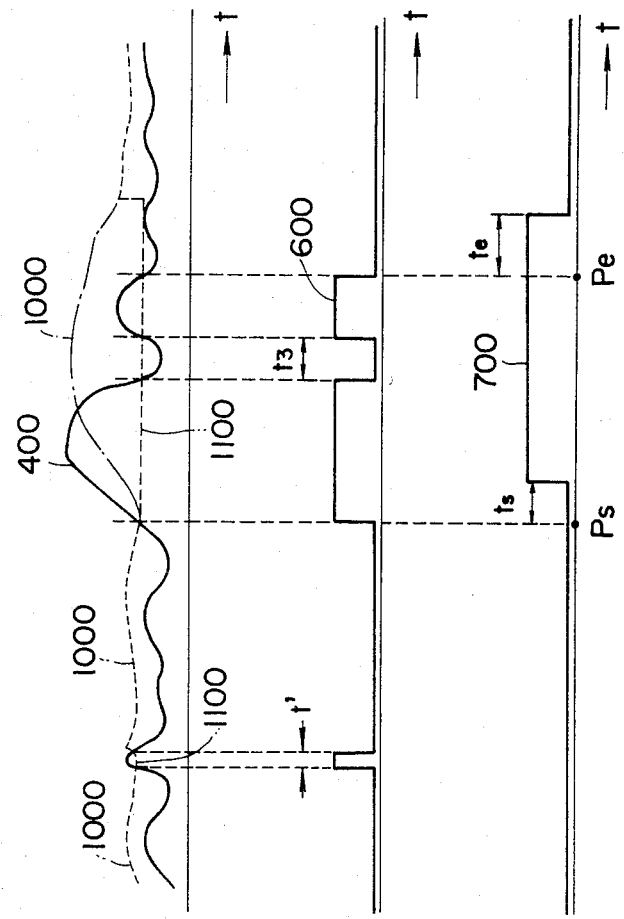
FIG. 7(A) is a graphical representation of the waveforms of a spoken instruction signal including noise as measured at points (B) and (E) in FIG. 6.
FIG. 7(B) is a graphical representation of the waveform of a spoken instruction pulse signal as measured at point (F) in FIG. 6.
FIG. 7(C) is a graphical representation of the waveform of the spoken instruction start/end signal as measured at point (G) in FIG. 6.

In more detail, when a H-voltage level signal (600) is outputted from the voltage level comparator 7-1, this signal is immediately applied to the holding circuit 22 via the OR gate 23 as a holding signal (1200). Therefore, the multiplied signal (1000) is held in response to the holding signal (1200) at the voltage level obtained just when a spoken instruction signal (400) exceeds the threshold level (1000) without any time delay ts. The held signal (1100) is applied to the voltage level comparator 7-1 as a reference end-detection threshold level, as depicted in FIG. 7(A).

Further, in this embodiment, although a case is shown in FIGS. 7(A) and (B) where the holding signal (1200) is also applied to the holding circuit 22 to output a held signal (1100) when noise included in the smoothed signal (400) exceeds the reference threshold level (1000) for a time period t' less than the reference start time ts, since the pulse duration comparator 7-2 does not detect the start of the spoken instruction, nothing happens in this case without need of detecting the end of the noise signal.

Furthermore, even if the signal (400) drops below the reference held threshold level (1100) for a time period less than the reference end time te after the level comparator 7-1 detects the start of the spoken instruction and outputs a H-voltage level signal to the holding circuit 22 via the OR gate 23, since the holding circuit is already held in response to the H-voltage level signal (1200) from the pulse duration comparator 7-2, the held signal (1100) is sustained.

In brief summation of the second embodiment of the voice detecting means according to the present invention, the reference start and end threshold levels are the same, which are determined when the spoken instruction start is detected in accordance with the threshold level variable according to the magnitude of spoken instruction signal. Further, in this embodiment, it is also possible to connect the H-voltage level signal (600) from the voltage level comparator 7-1 directly to the holding circuit 22 without use of the OR gate 23.

Figure 8:
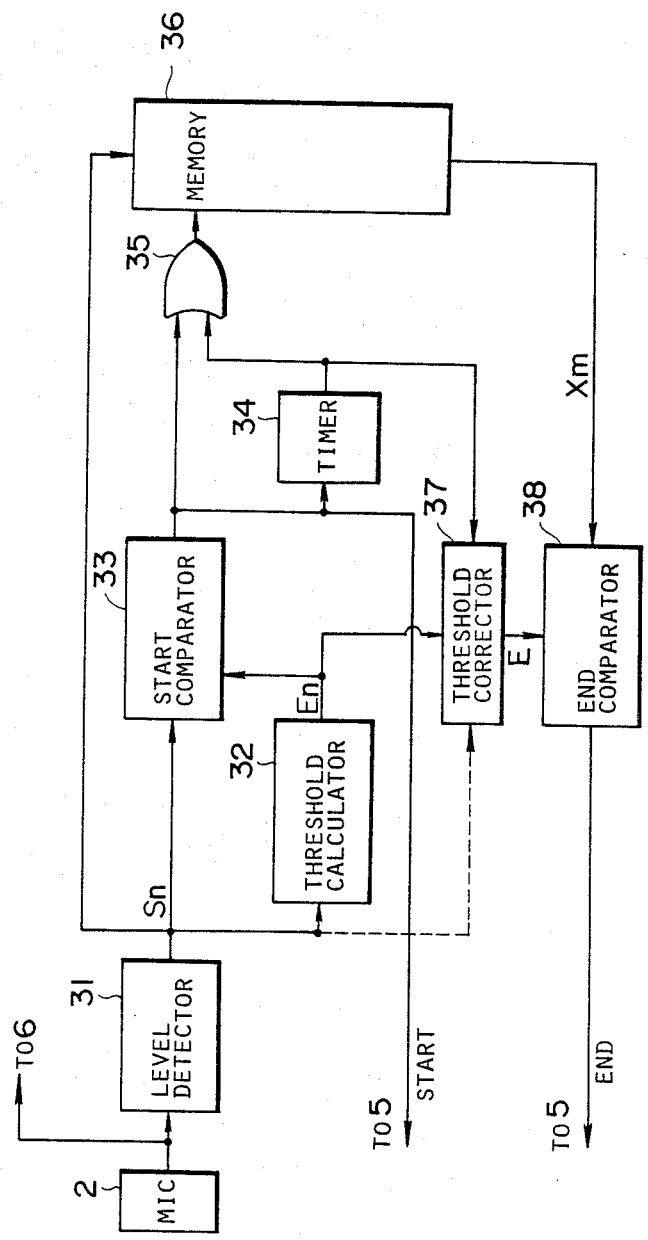
FIG. 8 is a schematic block diagram of a third embodiment of a voice detecting means of the speech recognition system for an automotive vehicle according to the present invention.

FIG. 8 shows a third embodiment of a voice detecting means of the speech recognition system according to the present invention. In this embodiment, in order to detect the end of spoken instruction reliably even if high-level noise is included in the spoken instruction, when a predetermined time period T has elapsed without detection of spoken instruction end after the start of spoken instruction has been detected, the reference end threshold level is corrected to a higher level.

In the figure, the reference numeral 2 denotes a microphone, the reference numeral 31 denotes a level detector for detecting the voltage level Sn of a spoken instruction signal including noise inputted from the microphone 2, the reference numeral 32 denotes a threshold calculator for calculating threshold levels En on the basis of the voltage level data Sn outputted from the level detector 31 and a calculation expression, the reference numeral 33 denotes a start comparator including a voltage level comparator and a pulse duration comparator for comparing the voltage level Sn and the pulse duration $M_1$ of the signal Sn from the level detector 32 with the threshold level En calculated by the threshold calculator 32 and with a reference start time $\tau_1(W_1)$ in order to detect the start of the spoken instruction signal, the reference numeral 34 denotes a timer unit for counting a predetermined time period T(L) beginning from when the start comparator 33 detects the start of spoken instruction, the reference numeral 35 denotes an OR gate, the reference numeral 36 denotes a memory unit for storing the spoken instruction signal voltage level data Sn from the level detector 31 sequentially beginning from when the start of spoken instruction is detected or while the timer unit 34 is outputting a timer signal and for outputting these stored spoken instruction signal voltage level data Xm in the reverse order after the predetermined time period T has elapsed. The capacity of this memory unit 36 must be sufficient to store the data Sn outputted from the level detector 31 for at least the time period T predetermined by the timer unit 34 (about one or two seconds). The reference numeral 37 denotes a threshold corrector for correcting the start-detection threshold level En calculated by the threshold calculator 32 in such a way that the calculated threshold level E is multiplied to an appropriate level or the level $S_L$ obtained when the time T was elapsed after the start has detected is added to the start-detection threshold level E.

The reference numeral 38 denotes an end comparator including another voltage level comparator and another pulse duration comparator for comparing the voltage level and pulse duration of the signal data Sn from the level detector 31 with the threshold level E' corrected by the threshold corrector 37 and with a reference end time $\tau_3(W_3)$ in order to detect the end of the spoken instruction signal.

Now, follows the description of operation of the third embodiment according to the present invention.

When a spoken instruction signal is inputted to the microphone 2, the voltage level of the signal is detected by the level detector 31. The detected voltage level data Sn are calculated by the threshold calculator 32 on the basis of a predetermined calculation expression to obtain a reference start threshold level En. These calculations correspond to the smoothing operation performed in the first and second embodiments shown in FIGS. 4 and 6. The detected signal level data Sn are compared sequentially with the calculated reference start threshold level En by the start comparator 33 with respect to voltage level and pulse duration. When the start of a spoken instruction is determined, a spoken instruction start command signal outputted from the start comparator 33 activates the controller 5 so as to output another command signal to the entire system for starting recognizing the spoken-instruction. The comond signal activates the memory unit 36 to store the voltage level data Sn outputted from the level detector 31 and activates the timer unit 34 to start counting a predetermined time period T. When the predetermined time period T has elapsed, the memory unit 36 stops storing the spoken instruction voltage level data Sn.

When the period T has elapsed, the timer unit T stops counting and outputs a L-voltage level signal to the memory unit 36 via the OR gate 35 and to the threshold corrector 37 directly. In response to this L-voltage level timer signal, the memory unit 36 outputs the spoken instruction voltage level data Xm previously stored after the start has been detected, in the reverse order, to the end comparator 38; the threshold corrector 37 multiplies the reference threshold level En obtained at the start detection and outputs the multiplied threshold level E to the end comparator 38. Therefore, the read level data Xm are compared sequentially, in the reverse order beginning from when the predetermined time T has elapsed after detection of spoken instruction start, with the multiplied threshold level E by the end comparator 38 with respect to pulse voltage level and pulse duration. When the end of spoken instruction is determined, a spoken instruction end command signal outputted from the end comparator 38 activates the controller 5 so as to output another command signal to the entire system for stopping recognizing the spoken instruction.

Figure 9:
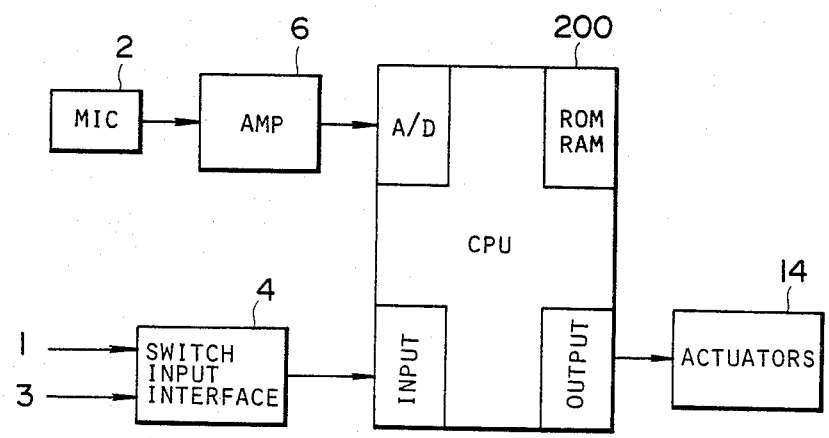
FIG. 9(A) is a schematic block diagram of a fourth embodiment of a voice detecting means of the speech recognition system for an automotive vehicle according to the present invention.

FIG. 9 shows a fourth embodiment of a voice detecting means of the speech recognition system according to the present invention. In this embodiment, the level detector 31, the threshold calculator 32, the start comparator 33, the timer unit 34, the OR gate 35, the memory unit 36, the threshold corrector 37 and the end comparator 38 described in the third embodiment shown in FIG. 8 are all incorporated within a mimicrocomputer 200 provided with an analog-to-digital converter, a central processing unit, a read-only memory, a random-access memory, and input/output interfaces, etc. That is to say, some of the functions of the voice detecting means are implemented via arithmetic operations executed in accordance with appropriate software, in place of hardware.

Further, in this embodiment, various elements or sections such as parameter extraction section 9, the memory 10, the reference pattern memory 11, the resemblance comparator 12, the resemblance determination section 13, the controller 5, etc. are all incorporated within the microcomputer 200 which performs the same functions as those of the above-mentioned discrete elements or sections in accordance with appropriate programs stored therein.

On the basis of digital signals representative of the spoken instruction signal inputted via the microphone 2, the microcomputer 200 detects the start and end of the spoken instruction in the same way as described previously with reference to FIG. 8.

Figure 10A:
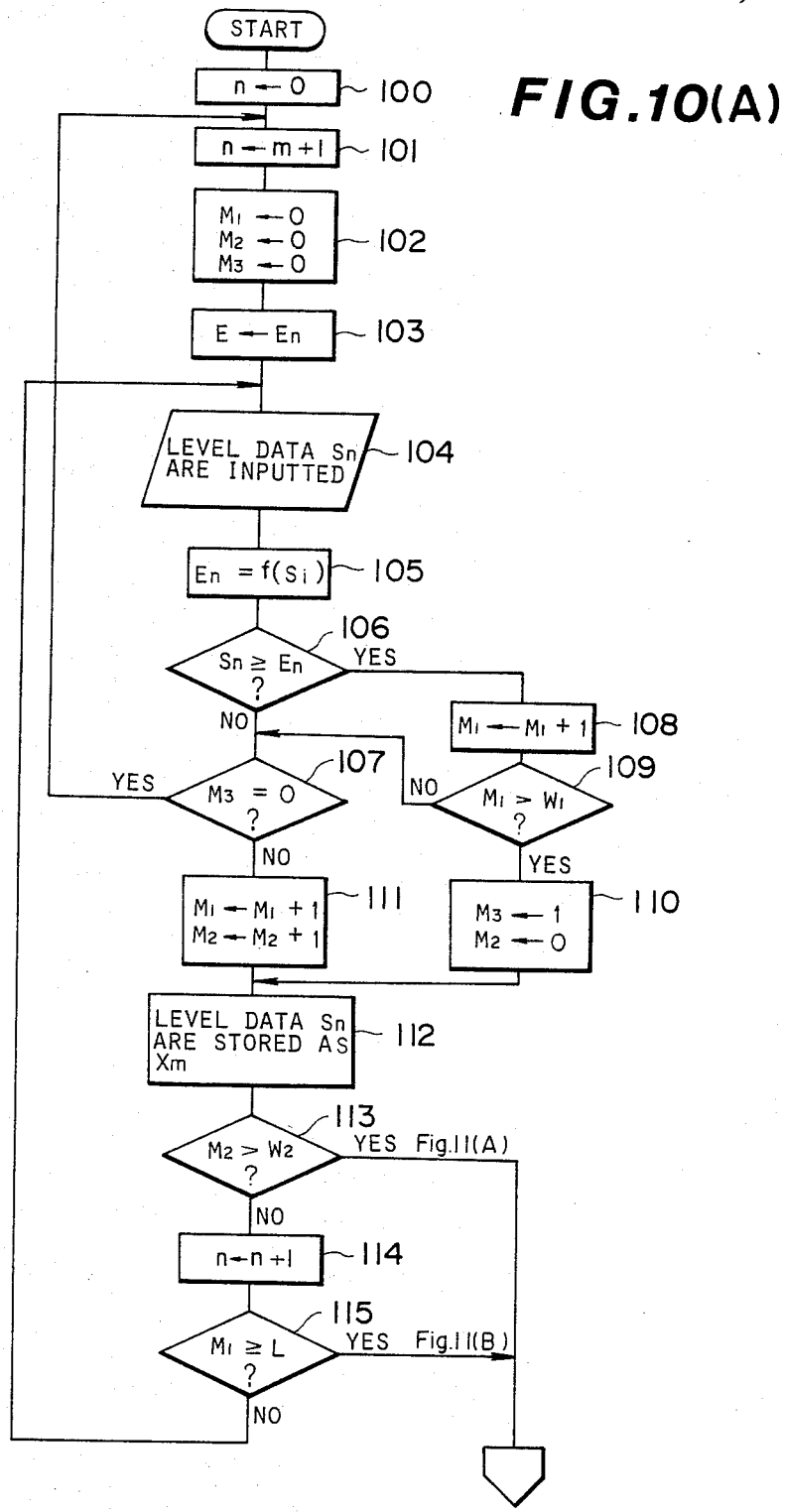
FIG. 10(A) is a flowchart of the method of detecting the start of a spoken instruction signal in accordance with a program stored in a microcomputer shown in FIG. 9.
Figure 11A:
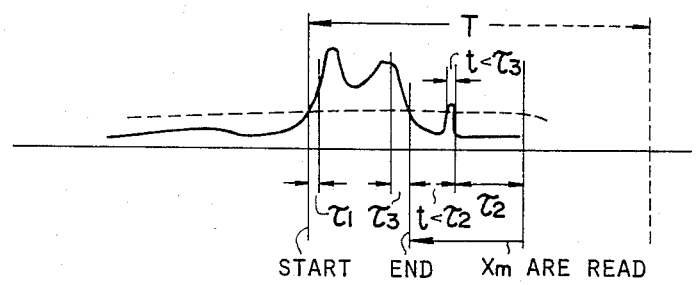
FIG. 11(A) is a graphical representation for assistance in explaining the method of detecting the start and end of a spoken instruction signal on the basis of arithmetic operations.

FIGS. 10(A) and (B) are flowcharts showing the steps of processing the digital signals from the A-D converter in order to obtain the spoken instruction start and end command signals; FIGS. 11(A) and (B) are time charts showing example waveforms of spoken instruction signals.

First, the steps of detecting the start of a spoken instruction will be described with reference to FIG. 10(A). In the figure, the labels mean the following contents:

n: suffix indicative of time

E: threshold voltage level otained when spoken instruction start is detected (referred to as start threshold level)

En: threshold voltage level calculated while spoken instruction levels are being sampled (referred to as calculation threshold level)

Sn: spoken instruction voltage level data Sn sampled for each smapling time interval (referred to as sample voltage level data)

$M_1$: number of sampling time intervals during each of which a sample level data Sn exceeds the calculation threshold level En (referred to as start-detection sample number)

$M_2$: number of sampling time intervals during each of which a sample level data Sn drops below the calculation threshold level En (referred to as sampling-stop sample number)

$M_3$: start-detection code, if "1", spoken instruction start is detected; if "0", spoken instruction start is not yet detected.

L: number of sampling time intervals within a time period T determined by the timer (referred to as timer sample number)

$W_1$: reference number of sampling time intervals corresponding to a reference start time $\tau_1$ (referred to as reference start-detection sample number)

$W_2$: reference number of sampling time intervals corresponding to a reference stop time $\tau_2$ (referred to as reference sampling-stop sample number)

Xm: data stored in the memory unit (referred to as stored data)

Program control first resets the time suffix n (in block 100) for incrementing the time suffix n in order (in block 101). Further, program control initializes the numbers of start-detection sample number $M_1$, sampling-stop sample number $M_2$ and the start detection code $M_3$ (in block 102), and additionally replaces the start threshold level E with the calculation threshold level En (in block 103). At any given time n, spoken instruction signal voltage level data Sn are inputted (in block 104). In response to these inputted sample voltage level data Sn, the current calculation threshold level En is calculated on the basis of, for instance, the following expression (in block 105):

$$En = \alpha \sum_{i=1}^{p} S(n - i) + \beta$$

where En indicates the mean threshold level over the time interval from 1 to p, where p is a fixed time period and $\alpha$ and $\beta$ denote constants. Next, the sample level Sn are compared with the calculation threshold level En (in block 106). If Sn is below En (in block 106) and therefore the start detection code is "0" (in block 107), since this indicates that the sampled signal level is lower than the calculated threshold level and therefore the start is not yet detected, the program returns to block 104 for repeating the same operations from block 104 to block 107. Thereafter, if Sn exceeds En, since this indicates that the sampled signal level is higher than the calculated threshold level, the start-detection sample number $M_1$ is incremented (in block 108). Next, $M_1$ is compared with the reference start-detection sample number $W_1$ corresponding to a reference start time $\tau_1$ (reference start time ts in FIGS. 5 and 7) (in block 109). For instance, if the sampling time interval is 9 ms and the time $\tau_1$ is 72 ms, $W_1$ is 8. If $M_1$ is greater than $W_1$ (in block 109), since this indicates that the sampled spoken instruction level data Sn exceeds the calculated threshold level En for more than the reference start time $\tau_1$, the start-detection code $M_3$ is set to "1" indicating that the start detection is completed and at the same time the sampling-stop sample number $M_2$ is reset (described later) (in block 110). From this moment, the sample level data Sn are stored in the memory 16 sequentially as stored voltage level data Xm (in block 112). If $M_1$ is below $W_1$ (in block 109), since this indicates that the sampled spoken instruction level data Sn exceeds the calculated threshold level En for less than the reference start time $\tau_1$ because of, for instance, noise, the program returns to block 107. In this state, of course, the start detection code $M_3$ is still "0", the program is repeated beginning from block 104.

Further, once the start-detection sample number $M_1$ exceeds the reference start-detection sample number $W_1$ (in block 109), since the start-detection code $M_3$ is set to "1" (in block 110), even if the sample voltage level data Sn drops below the calculation threshold level En (in block 106) after the start has been detected, $M_3$ is already "1" (in block 107) and therefore the sample data Sn are stored sequentially in the memory (in block 112).

Further, when the start-detection code $M_3$ is "1" (in block 107), the start-detection sample number $M_1$ and the sampling-stop sample number $M_2$ are both incremented (in block 111).

Thereafter, as $M_2$ increments, $M_2$ is compared with the reference sampling stop sample number $W_2$ corresponding to a time $\tau_2$ (for instance 40) (in block 113). If $M_2$ exceeds $W_2$, the program stops storing the data in the memory because Sn drops below En for more than a reference stop time $\tau_2$, advancing the succeeding step of detecting spoken instruction end (block 116) shown in FIG. 10(B). If $M_2$ is below $W_2$ since this indicates that Sn does not yet drop below En for more than $\tau_2$, n is incremented (in block 114). And, if $M_1$ exceeds the timer sample number L, the sample voltage level data Sn are stopped from being stored in the memory. If $M_1$ is below L, program returns to block 104 for repeating the same steps.

Secondly, the steps of detecting the end of spoken instruction will be described with reference to FIG. 10(B). In the figure, the labels means the following contents:

r: suffix indicative of time
m: memory address number after the start of spoken instruction is detected, indicated as $m = M_1 - r$
V: number of sampling time intervals during each of which sample level data Sn exceeds the correction threshold level En (referred to as end-detection sample number)
Xm: spoken instruction voltage level data read from the memory unit $W_3$: reference number of sampling time intervals corresponding to a reference end time $\tau_3$ (referred to as reference end-detection sample number)

Program control first reset the time suffix r and the end-detection sample number V (in block 116). Next, the start-detection sample number $M_1$ is compared with the timer sample member L (in block 117). If $M_1$ is equal to L, that is, the time period T determined by the timer has elapsed, the threshold level E is replaced with $E + S_L$ (where E denotes the start threshold level and $S_L$ denotes the sample voltage level obtained at the last sampling time interval (in block 118). This threshold correction corresponds to the threshold corrector 37 shown in FIG. 8. In this correction, it is also possible to replace it with the threshold level $E_L$ calculated on the level data sampled after the time period T has elapsed or the one obtained by adding a constant to the threshold level E. Next, the data Xm stored in Address No. m in the memory unit are read in the reverse order sequentially (in block 119) and compared with the replaced threshold level E' $(E + S_L)$ (in block 120). As a result, if Xm exceeds the replaced threshold level E', the time suffix r and end-detection sample number V are both incremented (in block 121). If Xm is below the E', only r is incremented but V is reset to "0" (in block 122), returning to block 119. Next, the end detection sample number V is compared with the reference end-detection smaple number $W_3$ (in block 123). If V exceeds $W_3$, since this indicates that the detection of end is completed (in step 123), the program ends. If V does not exceed $W_3$, since this indicates that the detection of end is not yet completed (in step 123), the program returns to block 119 for repeating the steps beginning from block 119.

Further, when $M_2$ exceeds $W_2$ in block 113, since this indicates that the voltage level data Sn which are below the threshold level En (in block 106) after the start has been detected (in block 107) continue for the time period $\tau_2$ ($W_2$) (in block 113), $M_1$ is not equal to L (in block 117). In this case, therefore, the program skips block 118 to block 119, without correcting the threshold level, and reads the stored data Xm (in block 119). In this state, although E' is E (start-detection threshold level), when Xm exceeds E (in block 120) for more than $\tau_3$ ($W_3$) (in block 123), the end of spoken instruction is detected.

Figure 11B:
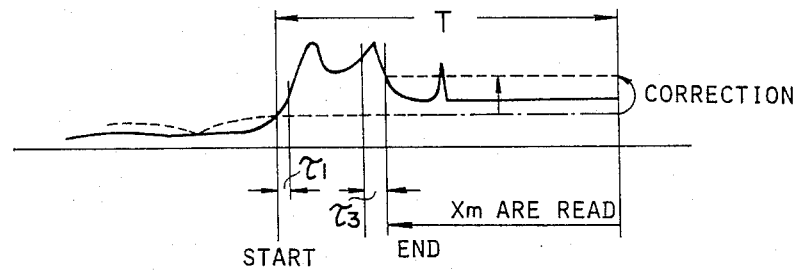
FIG. 11(B) is a graphical representation for assitance in explaining the method of detecting the start and end of another spoken instruction signal on the basis of arithmetic operations.

FIG. 11(A) shows an example of this case where the voltage level data Sn drop below the threshold level En after the start has been detected. In contrast with this, FIG. 11(B) shows an example of the case where the voltage level data Sn never drop below the start-detection threshold level E. In this case, the program advances from block 115, through blocks 117 and 118, to block 119. In both the cases, the spoken instruction end is detected when the data Sn exceeds the threshold level E or E' for more than $\tau_3$ in the reverse order.

Figure 12:
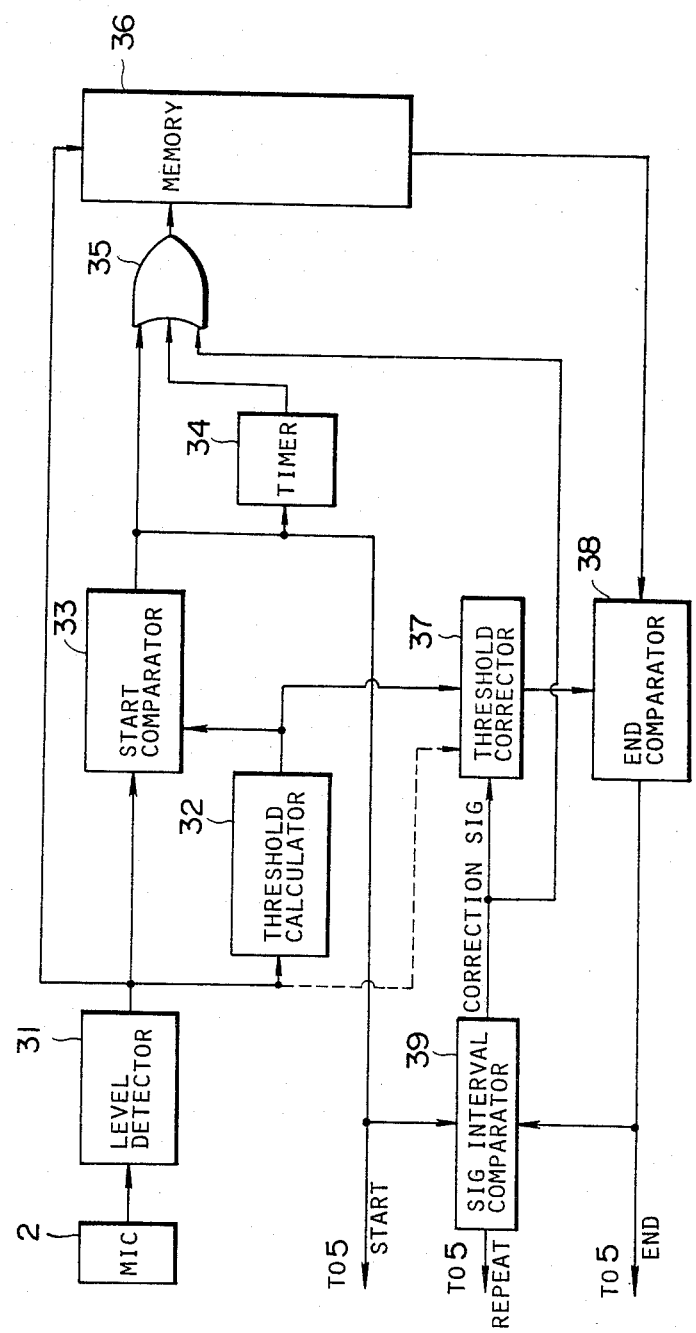
FIG. 12 is a schematic block diagram of a fourth embodiment of a voice detecting means of the speech recognition system for an automotive vehicle according to the present invention.

FIG. 12 shows a fifth embodiment of a voice detecting means of the speech recognition system according to the present invention. In this embodiment, in order to detect the end of spoken instruction more reliably even if high-level noise is included in the spoken instruction, when the time interval between the start and end of a spoken instruction exceeds a predetermined time interval, the reference end threshold level is further corrected to a still higher level and the spoken instruction end is detected again on the basis of this higher threshold level.

In this embodiment, there is additionally provided a signal interval comparator 39 for the third embodiment shown in FIG. 8. This signal interval comparator 39 receives the spoken instruction start command signal outputted from the start comparator 33 and the spoken instruction end command signal outputted from the end comparator 38, calculates the spoken instruction time interval on the basis of these two command signals, compares the calculated spoken instruction time interval with a predetermined value (for instance, about one second), and outputs a correction signal to the threshold corrector 37 directly and the memory unit 36 via the OR gate 35 when the calculated time interval exceeds a predetermined value. In response to this correction signal, the memory unit 36 outputs the stored spoken instruction signal voltage level data Xm again in the reverse order to the end comparator 38, and the threshold corrector 37 corects the reference end threshold level E' again to a voltage level higher than that corrected before. The end comparator 38 compares the data Xm with the newly-corrected threshold level again to detect the end of the spoken instruction. And if the spoken instruction time interval is shorter than the predetermined time interval, the end detection has been completed and the signal interval comparator 39 activates the controller 5 so as to output a spoken instruction end command signal. In contrast with this, if the spoken instruction time interval is longer than the predetermined interval, the end detection is not yet completed and the signal interval comparator 39 activates the threshold corrector 37 and the memory unit 36 so as to repeat the operation to detect the spoken instruction end.

The fifth embodiment according to the present invention can be incorporated within a microcomputer in the same manner as in the fourth embodiment shown in FIG. 9. That is to say, the additional functions of the voice detecting means can be implemented via arithmetic operation executed in accordance with appropriate software, in place of hardware.

On the basis of digital signals representative of the spoken instruction signal inputted via the microphone 2, the microcomputer 200 calculates the time interval of the spoken instruction in the same way as described already with reference to FIG. 12.

Figure 10B:
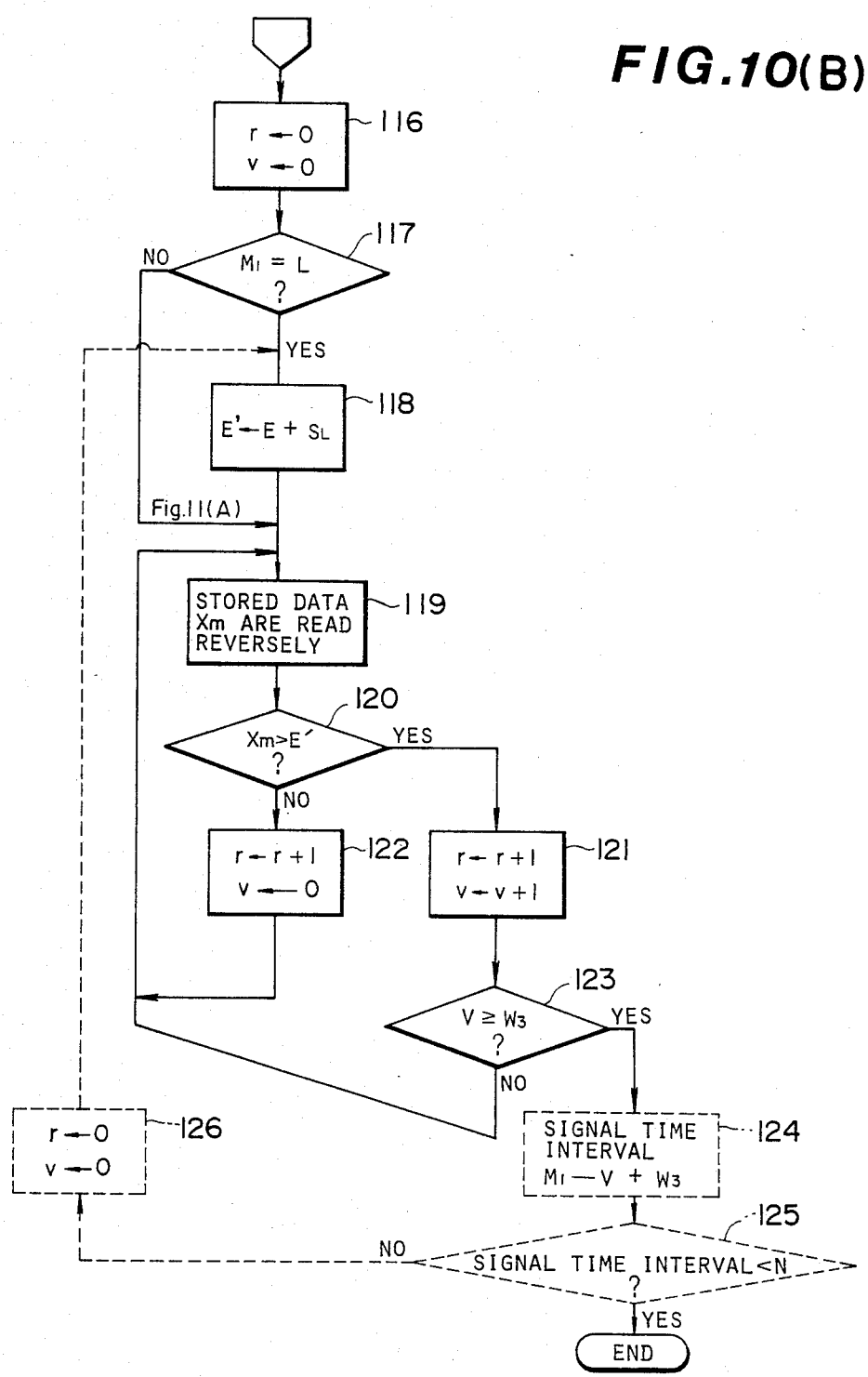
FIG. 10(B) is a flowchart of the method of detecting the end of a spoken instruction signal in accordance with another program stored in a microcomputer shown in FIG. 9.

FIG. 10(B) additionally shows the flowchart of the steps of processing the digital signals from the A-D converter in order to obtain the spoken instruction end signal, by dashed lines.

In the figure, if the end-detection sample member V exceeds the reference end-detection sample number $W_3$ (in block 123), since this indicates that the detection of spoken instruction end is completed, the program control additionally calculates the spoken instruction signal time interval, that is, the time interval between the start and end (in block 124). In this step, the time interval can be expressed as $M_1 - V + W_3$. Next, the calculated time interval of spoken instruction is compared with a predetermined time interval N (for instance, about 1.2 seconds) (in block 125). If the calculated time interval is shorter than N, the detection of end is completed. If the calculated time interval is longer than N, since this indicates that the end detection is not reliable, the program resets the time suffix r and end-detection sample number V (in block 126), returning to block 118. In block 118, the threshold value E' is corrected again to a more higher value for repeating the same operation beginning from block 118.

As described above, in the voice detecting means of the speech recognition system for an automotive vehicle according to the present invention, since the start of the spoken instruction is detected on the basis of the threshold level varying according to the voltage level of an inputted spoken instruction signal including noise within the passenger compartment and since the end of the spoken instruction is detected on the basis of the threshold level fixed when the start of spoken instruction is detected, it is possible to detect the start and end of the spoken instruction reliably, because the threshold level does not increase gradually after the start has been detected, while the spoken instruction is being inputted, without influence of a large time constant of the smoother for averaging the spoken instruction voltage level.

Furthermore, when the end of spoken instruction is not yet detected for a predetermined time period after the start has been detected or when the spoken instruction time interval between the start and end is longer than a predetermined time interval, since the threshold level is corrected to a higher threshold level on the basis of calculations, it is possible to detect the end of spoken instruction more reliably even if noise level rises abruptly while the spoken instruction is being inputted.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A speech recognition system for an automotive vehicle for activating an actuator in response to a spoken instruction inputted through a microphone which comprises:
  (a) first smoothing means for smoothing the spoken instruction signal inputted through the microphone;
  (b) second smoothing means for smoothing the spoken instruction signal inputted through the microphone, said second smoothing means having a time constant longer than that of said first smoothing means;
  (c) signal level increasing means for increasing the spoken instruction signal voltage level smoothed by said second smoothing means;
  (d) threshold level outputting means for outputting a first threshold level for detecting the start of the spoken instruction and a second threshold level for detecting the end of spoken instruction in dependence upon the signal voltage level increased by said signal level increasing means, the second threshold level being equal to or higher than the first threshold level;
  (e) means for comparing the spoken instruction signal voltage level smoothed by said first smoothing means with the first and second threshold levels outputted from said threshold level outputting means with respect to voltage level and signal duration, and for outputting a spoken instruction start command signal when the spoken instruction signal voltage level smoothed by said first smoothing means exceeds the first threshold level for more than a reference start time and a spoken instruction end command signal when the spoken instruction signal voltage level smoothed by said first smoothing means drops below the second threshold level for more than a reference end time; and (f) a speech recognizer for starting recognizing the spoken instruction signal inputted through the microphone in response to the start command signal and stopping recognizing the same signal in response to the end command signal.

2. A speech recognition system for an automotive vehicle as set forth in claim 1, wherein said means for outputting the first and second threshold levels is means for holding the spoken instruction signal voltage level increased by said signal voltage level increasing means, said holding means outputting the spoken instruction signal voltage level from said signal voltage level increasing means freely as the first start threshold level before the start is detected and outputting the spoken instruction signal voltage level obtained when the start is detected as the second end threshold level in response to a holding signal outputted from said comparing means when said comparing means outputs the spoken instruction start command signal.

3. A speech recognition system for an automotive vehicle as set forth in claim 1, wherein:
   (a) said first smoothing means is a voltage level detector connected to the microphone for detecting the voltage level of the spoken instruction signal for each sampling time interval;
   (b) said second smoothing means, said signal level increasing means, and said threshold level outputting means are:
      (1) a threshold calculator connected to said level detector for calculating the first start threshold level on the basis of an calculation expression in dependence upon the spoken instruction signal voltage levels outputted from said level detector;
      (2) a timer unit for outputting a timer signal for a predetermined time period;
      (3) a memory unit connected to said level detector and said timer unit for storing the sampled spoken instruction voltage level data from said voltage level detector; and
      (4) a threshold corrector connected to said threshold calculator and said timer unit for correcting the first start threshold level calculated by said threshold calculator to a higher second end threshold level when said timer unit stops outputting the timer signal; and
   (c) said comparing means is:
      (1) a start comparator connected to said level detector, said threshold calculator, said memory unit and said timer for comparing the sampled spoken instruction signal voltage level data from said voltage level detector with the first start threshold level from said threshold calculator with respect to voltage level and number of sampled data and outputting a spoken instruction start command signal to said timer unit and said memory unit when the sampled signal voltage level data of more than a reference start number exceed the first calculated start threshold level continuously, in response to the start command signal said timer unit starting outputting the timer signal for a predetermined time period, in response to the timer signal said memory unit starting storing the signal voltage level data from said voltage level detector and outputting the stored signal level data in the reverse order when said timer unit stops outputting the time signal; and
      (2) an end comparator connected to said threshold corrector and said memory unit for comparing the spoken instruction signal voltage level data read out from said memory unit in the reverse order with the second end threshold level corrected by said threshold corrector with respect to voltage level and number of sampled data and outputting a spoken instruction end command signal when the read signal voltage level data of more than a reference end number exceed the second corrected end threshold level continuously.

4. A speech recognition system for an automotive vehicle for activating an actuator in response to a spoken instruction inputted through a microphone which comprises:
   (a) a spectrum normalizing amplifier connected to said microphone for amplifying and spectrum-normalizing the spoken instruction signal transduced by the microphone;
   (b) a rectifier connected to said spectrum normalizing amplifier for rectifying the amplified spoken instruction signal;
   (c) a first smoother connected to said rectifier for smoothing the rectified spoken instruction signal and outputting a first smoothed signal;
   (d) a second smoother connected to said rectifier for smoothing the rectified spoken instruction signal at a time constant longer than that of said first smoother and outputting a second smoothed signal;
   (e) a multiplier connected to said second smoother for multiplying the second smoothed spoken instruction signal;
   (f) a holding circuit connected to said multiplier for passing the multiplied spoken instruction signal as a reference start threshold level when a holding signal is not applied thereto but holding the multiplied spoken instruction signal as a reference end threshold level when the holding signal is applied thereto, and outputting the held signal thereafter;
   (g) a level comparator one input terminal of which is connected to said first smoother and the other input terminal of which is connected to said holding circuit for comparing the first smoothed spoken instruction signal with the reference start threshold level when the holding signal is not applied to said holding circuit and outputting a H-voltage level signal when the first smoothed signal exceeds the reference start threshold level and for comparing the first smoothed spoken instruction signal with the reference end threshold level when the holding signal is applied to said holding circuit and outputting a L-voltage level signal when the first smoother signal drops below the reference end threshold level;
   (h) a duration comparator connected to said level comparator and said holding circuit for comparing the pulse width of the H-voltage level signal with a reference start time and outputting a spoken instruction start command signal when the H-voltage level pulse width exceeds the reference start time and for comparing the pulse width of the L-voltage level signal with a reference end time and outputting a spoken instruction end command signal when the L-voltage level pulse width exceeds the reference end time, the H-voltage level signal from said duration comparator being applied to said holding circuit as the holding signal; and (i) a speech recognizer connected to said duration comparator for starting recognizing the spoken instruction signal inputted through the microphone in response to the start command signal and stopping recognizing the same signal in response to the end command signal.

5. A speech recognition system for an automotive vehicle as set forth in claim 4, which further comprises an OR gate one input terminal of which is connected to said level comparator, the other input terminal of which is connected to said duration comparator, and the output terminal of which is connected to said holding circuit for holding said holding circuit when at least one of two signals from said level comparator and said duration comparator is applied to said holding circuit.

6. A speech recognition system for an automotive vehicle for activating an actuator in response to a spoken instruction inputted through a microphone which comprises:

(a) a level detector connected to the microphone for detecting the voltage level of the spoken instruction signal for each sampling time interval;

(b) a threshold calculator connected to said level detector for calculating the first start threshold levels on the basis of a calculation expression in dependence upon the spoken instruction signal voltage levels outputted from said level detector;

(c) a start comparator connected to said level detector and said threshold calculator for comparing the sampled spoken instruction signal voltage level data from said level detector with the first start threshold level from said threshold calculator with respect to voltage level and number of sampled data and outputting a spoken instruction start command signal when the sampled signal level data of more than a reference start number exceeds the first calculated start threshold level continuously, (d) a timer unit connected to said start comparator for outputting a timer signal for a predetermined time period in response to the spoken instruction start command signal;

(e) an OR gate one input terminal of which is connected to said start comparator and the other input terminal of which is connected to said timer unit for outputting an ORed signal;

(f) a memory unit connected to said level detector and said OR gate for storing the spoken instruction voltage level data from said level detector in response to the spoken instruction start command signal from said start comparator and outputting the voltage level data stored in said memory unit, in the reverse order, when said timer unit stops outputting the timer signal;

(g) a threshold corrector connected to said threshold calculator and said timer unit for correcting the first start threshold level calculated by said threshold calculator to a higher second end threshold level when said timer unit stops outputting the timer signal;

(h) an end comparator connected to said threshold corrector and said memory unit for comparing the spoken instruction signal level data read from said memory unit in the reverse order with the second end threshold level corrected by said threshold level corrector with respect to voltage level and number of sampled data when said timer unit stops outputting the timer signal and outputting a spoken instruction end command signal when the read signal level data of more than a reference end number exceeds the second corrected end threshold level continuously; and (i) a speech recognizer connected to said start comparator and said end comparator for starting recognizing the spoken instruction signal inputted through the microphone in response to the start command signal and stopping recognizing the same signal in response to the end command signal.

7. A speech recognition system for an automotive vehicle as set forth in either of claim 3 or 6, which further comprises a signal interval comparator connected to said start comparator, said end comparator, said threshold corrector and said memory unit for calculating the spoken signal time interval between start command signal from said start comparator and end command signal from said end comparator, comparing the calculated signal time interval with a reference time interval, and outputting a command signal to said memory unit to store again the sampled spoken instruction voltage level data from said level detector and to said threshold corrector to correct the spoken instruction end threshold level to a more higher level, when the calculated time interval is longer than the reference time interval, in order to repeat the detection of spoken instruction end.

8. A speech recognition system for an automotive vehicle as set forth in either of claim 3 or 6 wherein the second end threshold level is corrected by multiplying the start threshold level, calculated when the spoken instruction start command signal is outputted from said start comparator, by a constant.

9. A speech recognition system for an automotive vehicle as set forth in either of claim 3 or 6, wherein the second end threshold level is corrected by adding the start threshold level, calculated when the spoken instruction start command signal is outputted from said start comparator, to the spoken instruction signal voltage level sampled a timer-predetermined time period after the start command signal is outputted.

10. A speech recognition system for an automotive vehicle as set forth in either of claim 3 or 6, wherein the second end threshold level is corrected by adding the start threshold level, calculated when the spoken instruction start command signal is outputted from said start comparator, to the threshold level calculated a timer-predetermined time period after the start command signal is outputted.

11. A speech recognition system for an automotive vehicle as set forth in either of claim 3 or 6, wherein the second end threshold level is corrected by adding the start threshold level, calculated when the spoken instruction start command signal is outputted from said start comparator, to a constant.

12. A method of detecting the start and end of a spoken instruction inputted through a microphone to activate an actuator by a speech recognition system for an automotive vehicle, which comprises the following steps of:

(a) sampling spoken instruction signal voltage levels $S_n$ for each sampling time interval;

(b) calculating first start threshold levels $E_n$ in dependence upon the sampled signal voltage level data $S_n$ on the basis of an expression;

(c) comparing the sampled signal voltage levels $S_n$ with the calculated start threshold level $E_n$;

(d) if a sampled signal voltage level Sn exceeds the calculated start threshold level En, counting the number $M_1$ of signal level data Sn exceeding the threshold level En;

(e) comparing the counted number $M_1$ with a reference start number $W_1$;

(f) if the counted number $M_1$ exceeds the reference start number $W_1$, outputting a spoken instruction start command signal $M_3$ and storing the sampled signal voltage level data Sn in a memory sequentially;

(g) if the counted number $M_1$ does not exceed the reference start number $W_1$ in step (f) above, returning to step (a) above;

(h) comparing the counted number $M_1$ with a reference number L;

(i) if the counted number $M_1$ is equal to the reference number L, correcting the first start threshold level E obtained when the start is detected to a higher second end threshold level E';

(j) reading the spoken instruction voltage level data Xm stored in the memory in the reverse order;

(k) comparing the read data Xm with the second corrected end threshold level E';

(l) if a read data Xm exceeds the second end threshold level E', counting the number V of the read data Xm exceeding the second end threshold level E';

(m) comparing the counted number V of read data Xm with a reference end-detection number $W_3$;

(n) if the counted number V of read data Xm exceeding the second end threshold level E' exceeds the reference end-detection number $W_3$, outputting a spoken instruction end detection command signal; and (o) if the read data Xm do not exceed the second end threshold level E' in step (k) above or if the counted number V of read data Xm exceeding the second end threshold level E' does not exceed the reference end-detection number $W_3$ in step (m) above, returning to step (j) above.

13. A method of detecting the start and end of a spoken instruction as set forth in claim 12, which further comprises the following steps of:

(a) after the start of a spoken instruction has been detected, if a sampled signal voltage level Sn drops below the calculated start threshold level En in step (c) in claim 12, counting the number $M_2$ of the signal level data Sn dropping below the threshold level En;

(b) comparing the counted number $M_2$ with a reference sampling-stop number $W_2$; and (c) if the counted number $M_2$ exceeds the reference sampling-stop number $W_2$, skipping to step (j) in claim 12, for reading the spoken instruction voltage level data Xm stored in the memory in the reverse order.

14. A method of detecting the start and end of a spoken instruction as set forth in claim 13 which further comprises the following steps of:

(a) if the counted number V of read voltage level data Xm exceeding the second end threshold level E' exceeds the reference end-detection number $W_3$, calculating the spoken instruction signal time interval between start command signal and end command signal;

(b) comparing the calculated signal time interval with a reference time interval N;

(c) if the calculated time interval is longer than the reference time interval N, returning to step (i) in claim 12 for correcting the first start threshold level E to a still higher level E''; and (d) if the calculated time interval is smaller than the reference time interval N, outputting a spoken instruction end detection command signal.

* * * * *